United States Patent
Malinin et al.

(10) Patent No.: US 10,367,422 B1
(45) Date of Patent: Jul. 30, 2019

(54) VALLEY MODE SWITCHING WITH FIXED FREQUENCY FOR SWITCHING MODE POWER SUPPLY

(71) Applicant: Infineon Technologies Austria AG, Villach (AT)

(72) Inventors: Andrey Malinin, Fort Collins, CO (US); Renato Bessegato, Oberhaching (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/172,229

(22) Filed: Oct. 26, 2018

(51) Int. Cl.
*H02M 3/335* (2006.01)
*H02M 1/08* (2006.01)
*H02M 1/00* (2006.01)

(52) U.S. Cl.
CPC ......... *H02M 3/33507* (2013.01); *H02M 1/08* (2013.01); *H02M 2001/0009* (2013.01)

(58) Field of Classification Search
None
See application file for complete search history.

(56) References Cited

U.S. PATENT DOCUMENTS

| | | | |
|---|---|---|---|
| 7,433,211 B1* | 10/2008 | Collmeyer | H02M 1/4225 323/282 |
| 8,755,203 B2 | 6/2014 | Li et al. | |
| 9,660,542 B2 | 5/2017 | Schaemann et al. | |
| 2012/0049753 A1* | 3/2012 | Hwang | H05B 33/0818 315/224 |
| 2014/0078790 A1* | 3/2014 | Lin | H02M 3/33507 363/21.16 |
| 2017/0212632 A1* | 7/2017 | Shi | G06F 3/0416 |
| 2019/0006935 A1* | 1/2019 | Wang | H02M 3/33507 |

* cited by examiner

*Primary Examiner* — Jeffrey A Gblende
(74) *Attorney, Agent, or Firm* — Shumaker & Sieffert, P.A.

(57) ABSTRACT

A controller for a switching mode power converter is configured to drive a switching element to selectively connect a supply to a primary side winding of a transformer to generate a regulated voltage, current, or power at a secondary side winding of the transformer. The controller is configured to, for each switching cycle, select a peak current value from a plurality of peak current values calculated to drive an oscillating voltage at the switching element to correspond to a voltage valley and in response to determining a voltage valley is occurring at the oscillating voltage at the switching element, output an enabling signal to cause the switching element to generate a channel electrically connecting the supply to the primary side winding until current at the switching element is not less than the selected peak current value.

20 Claims, 5 Drawing Sheets

US 10,367,422 B1

VALLEY MODE SWITCHING WITH FIXED FREQUENCY FOR SWITCHING MODE POWER SUPPLY

TECHNICAL FIELD

This disclosure relates to circuitry for valley mode switching and, more particularly, circuitry for valley mode switching with a fixed frequency for flyback controllers.

BACKGROUND

Switching mode power supplies may use soft switching techniques. For example, a flyback controller causes switching transitions to occur only when a voltage across the switch is zero. In another example, a flyback controller causes switching transitions to occur only when a current through the switch is zero. In this way, switching mode power supplies may reduce switching loss.

SUMMARY

In general, this disclosure is directed to a circuit configured for valley mode switching with fixed frequency. For example, a controller for a switching mode power supply may select peak current values from a set of peak current values that would result in a fixed frequency. In some examples, the controller calculates the set of peak current values based on a ringing frequency period of an oscillating voltage at a switching element. In this way, the controller may select a peak current value to generate a regulated voltage, current, or power while helping to maintain a fixed frequency.

In an example, a controller for a switching mode power converter is configured to drive a switching element to selectively connect a supply to a primary side winding of a transformer to generate a regulated voltage, current, or power at a secondary side winding of the transformer. To drive the switching element to selectively connect the supply, the controller is configured to, for each switching cycle of a plurality of switching cycles: select a peak current value from a plurality of peak current values, each peak current value of the plurality of peak current values being calculated to drive an oscillating voltage at the switching element to correspond to a voltage valley at an end of a respective switching cycle of the plurality of switching cycles, in response to determining a voltage valley is occurring at the oscillating voltage at the switching element, output an enabling signal to cause the switching element to generate a channel electrically connecting the supply to the primary side winding until current at the switching element is not less than the selected peak current value, and output a disabling signal to cause the switching element to refrain from generating the channel electrically connecting the supply to the primary side winding after current at the switching element is not less than the selected peak current value.

In another example, a method for switching a power converter includes driving, by a controller, a switching element to selectively connect a supply to a primary side winding of a transformer to generate a regulated voltage, current, or power at a secondary side winding of the transformer. Driving the switching element to selectively connect the supply comprises, for each switching cycle of a plurality of switching cycle: selecting a peak current value from a plurality of peak current values, each peak current value of the plurality of peak current values being calculated to drive an oscillating voltage at the switching element to correspond to a voltage valley at an end of a respective switching cycle of the plurality of switching cycles, in response to determining a voltage valley is occurring at the oscillating voltage at the switching element, outputting an enabling signal to cause the switching element to generate a channel electrically connecting the supply to the primary side winding until a current at the switching element is not less than the selected peak current value, and outputting a disabling signal to cause the switching element to refrain from generating the channel electrically connecting the supply to the primary side winding after current at the switching element is not less than the selected peak current value.

In another example, a system for operating a switching mode power converter includes a supply, a transformer comprising a primary side winding and a secondary side winding, a switching element, and a controller. The controller is configured to drive the switching element to selectively connect the supply to the primary side winding to generate a regulated voltage, current, or power at the secondary side winding. To drive the switching element to selectively connect the supply, the controller is configured to, for each switching cycle of a plurality of switching cycles select a peak current value from a plurality of peak current values, each peak current value of the plurality of peak current values being calculated to drive an oscillating voltage at the switching element to correspond to a voltage valley at an end of a respective switching cycle of the plurality of switching cycles, in response to determining a voltage valley is occurring at the oscillating voltage at the switching element, output an enabling signal to cause the switching element to generate a channel electrically connecting the supply to the primary side winding until current at the switching element is not less than the selected peak current value, and output a disabling signal to cause the switching element to refrain from generating the channel electrically connecting the supply to the primary side winding after current at the switching element is not less than the selected peak current value.

Details of these and other examples are set forth in the accompanying drawings and the description below. Other features, objects, and advantages will be apparent from the description and drawings, and from the claims.

DETAILED DESCRIPTION

Some switching mode power supplies may use valley mode switching to reduce switching loss and improve Electromagnetic Interference (EMI) performance. In such switching mode power supplies, synchronization with valley mode switching may result in the switching frequency being variable with the switching period changes by at least one ringing cycle. The switching frequency being variable with the switching period changes by at least one ringing cycle could cause up to +/−20% frequency change, which is unacceptable for some applications.

An example switching mode power supply includes a flyback off-line power supply comprising: (1) a power stage in a flyback configuration with a Synchronous Rectifier (SR) Metal-Oxide-Semiconductor Field Effect Transistor (MOSFET) instead of the output rectifier diode; (2) a primary side controller controlling a primary side switch; and (3) a secondary side controller controlling a secondary side switch.

Accordingly, in order to minimize switching frequency changes, systems described herein may include a controller configured to select peak current values from a set of peak current values that would result in a fixed frequency. That is, the controller may operate the example switching mode power supply based on selecting the right peak current values from a discrete available level to enable valley mode switching to operate at fixed switching frequency. Techniques described herein for valley mode switching with fixed frequency may allow a quasi-resonance operation at the fixed switching frequency and may reduce filter constraints.

Figure 1:
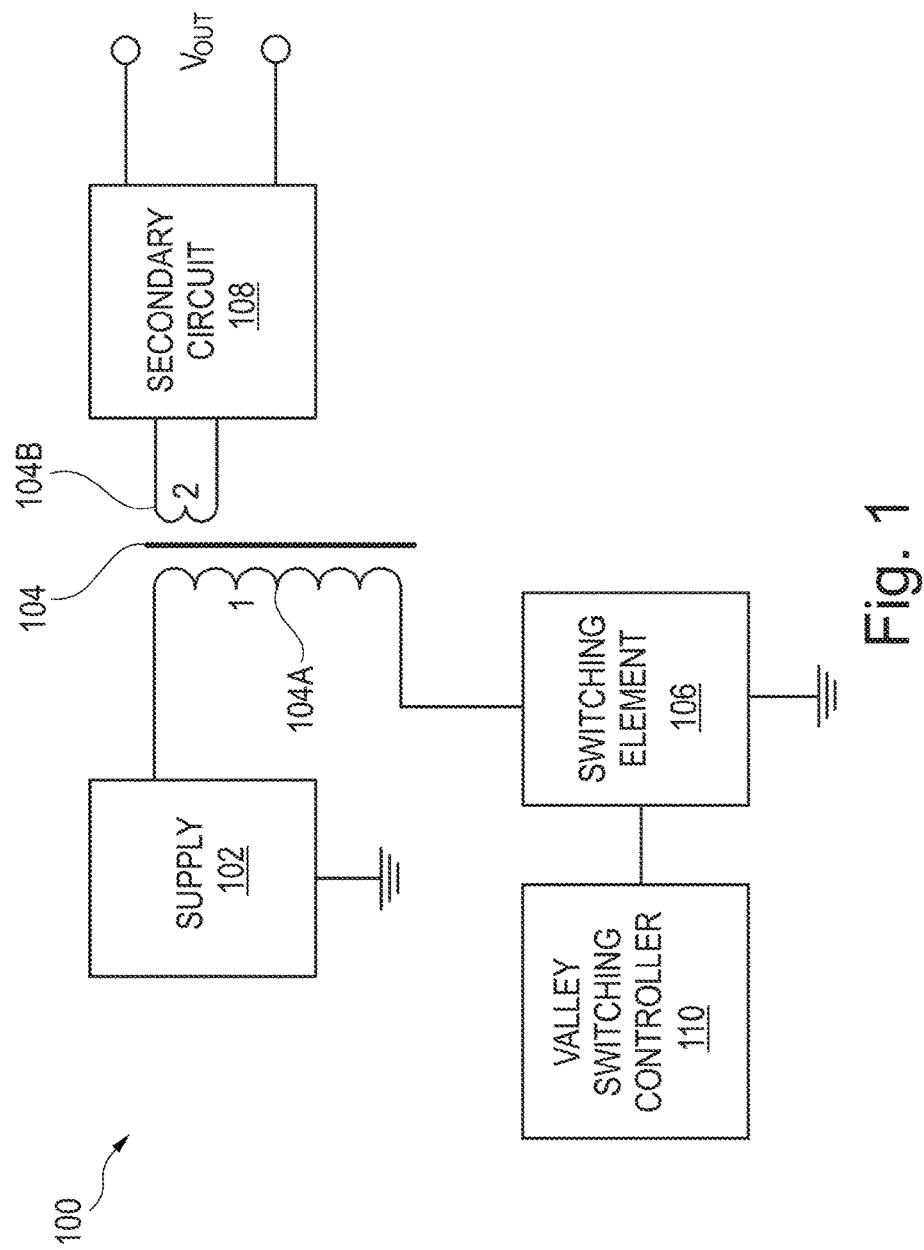
FIG. 1 is a block diagram illustrating a system configured for valley mode switching with fixed frequency in accordance with one or more techniques of this disclosure.

FIG. 1 is a block diagram illustrating a system configured for valley mode switching with fixed frequency in accordance with one or more techniques of this disclosure. FIG. 1 shows system 100 which includes supply 102, primary side winding 104A and secondary side winding 104B (collectively, transformer 104), switching element 106, secondary circuit 108, and valley switching controller 110. System 100 may include additional components than those shown. For example system 100 may include a current sensor, a voltage sensor, and/or another component.

Supply 102 may be configured to provide electrical power to one or more other components of system 100. For instance, supply 102 may be configured to supply an input power to primary side winding 104A. In some examples, supply 102 may be an output of a power converter or power inverter. For instance, supply 102 may comprise an output of a Direct Current (DC) to DC power converter, an AC to DC power converter, a DC to AC power inverter, and the like. In some examples, supply 102 may represent a connection to an electrical supply grid. In some examples, the input power signal provided by supply 102 may be a DC input power signal. For instance, supply 102 may be configured to provide a DC input power signal in the range of ~5 VDC to ~40 VDC. In some examples, supply 102 may be a battery which may be configured to store electrical energy. Examples of batteries may include, but are not limited to, nickel-cadmium, lead-acid, nickel-metal hydride, nickel-zinc, silver-oxide, lithium-ion, lithium polymer, any other type of rechargeable battery, or any combination of such batteries.

Switching element 106 may be configured to selectively establish a channel that electrically connects supply 102 and primary side winding 104A. Switching element 106 may include, but is not limited to, Silicon-Controlled Rectifier (SCR), a Field Effect Transistor (FET), and Bipolar Junction Transistor (BJT). Examples of FETs may include, but are not limited to, Junction Field-Effect Transistor (JFET), MOSFET, dual-gate MOSFET, Insulated-Gate Bipolar Transistor (IGBT), any other type of FET, or any combination of the same. Examples of MOSFETS may include, but are not limited to, P-type Metal-Oxide-Semiconductor (PMOS), N-type Metal-Oxide-Semiconductor (NMOS), Double-diffused Metal-Oxide-Semiconductor (DMOS), or any other type of MOSFET, or any combination of the same. Examples of BJTs may include, but are not limited to, PNP, NPN, heterojunction, or any other type of BJT, or any combination of the same. It should be understood that switching element 106 may be a high side switch or low side switch. Switching element 106 may be voltage-controlled and/or current-controlled. Examples of current-controlled switching elements may include, but are not limited to, Gallium Nitride (GaN) MOSFETs, BJTs, or other current-controlled elements.

Valley switching controller 110 may be configured to drive switching element 106 to provide input power to primary side winding 104A for generating a regulated voltage, current, or power at secondary side winding 104B. For example, valley switching controller 110 may increase a duty cycle for driving switching element 106 to increase the voltage, current, or power at secondary side winding 104B. Valley switching controller 110 may decrease the duty cycle to decrease the voltage, current, or power at secondary side winding 104B.

Valley switching controller 110 may be configured for valley switching. For example, valley switching controller 110 may be configured to output an enabling signal to cause switching element 106 to switch in at a voltage valley occurring at the oscillating voltage at switching element 106. As used herein, a voltage valley may refer to a voltage at the oscillating voltage that is less than a voltage occurring immediately before the valley voltage and a voltage occurring immediately after the valley voltage.

Valley switching controller 110 may comprise an analog circuit. In other examples, valley switching controller 110 may comprise a microcontroller on a single integrated circuit containing a processor core, memory, inputs, and outputs. For example, valley switching controller 110 may include one or more processors, including one or more microprocessors, Digital Signal Processors (DSPs), Application Specific Integrated Circuits (ASICs), Field Programmable Gate Arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, valley switching controller 110 may be a combination of one or more analog components and one or more digital components.

Secondary circuit 108 may be configured to provide power from secondary side winding 104B and to prevent power from being supplied to secondary side winding 104B. Secondary circuit 108 may include one or more diodes, one or more synchronous rectifiers, a (filter) capacitor, and/or other electrical components.

In accordance with one or more techniques described herein, valley switching controller 110 may drive switching element 106 to selectively connect supply 102 to primary side winding 104A of transformer 104 to generate a regulated voltage, current, or power at secondary side winding 104B of transformer 104. To drive switching element 106 to selectively connect supply 102, valley switching controller 110 is configured to, for each switching cycle of a plurality of switching cycles: select a peak current value from a plurality of peak current values. Each peak current value of the plurality of peak current values is calculated to drive an oscillating voltage at switching element 106 to correspond to a voltage valley at an end of a respective switching cycle of the plurality of switching cycles.

In response to determining a voltage valley is occurring at the oscillating voltage at switching element 106, valley switching controller 110 is configured to output an enabling signal to cause switching element 106 to generate a channel electrically connecting supply 102 to primary side winding 104A until current at switching element 106 is not less than the selected peak current value and output a disabling signal to cause switching element 106 to refrain from generating the channel electrically connecting supply 102 to primary side winding 104A after current at switching element 106 is not less than the selected peak current value. In this way, system 100 may help to minimize switching frequency changes in valley mode switching.

Figure 2:
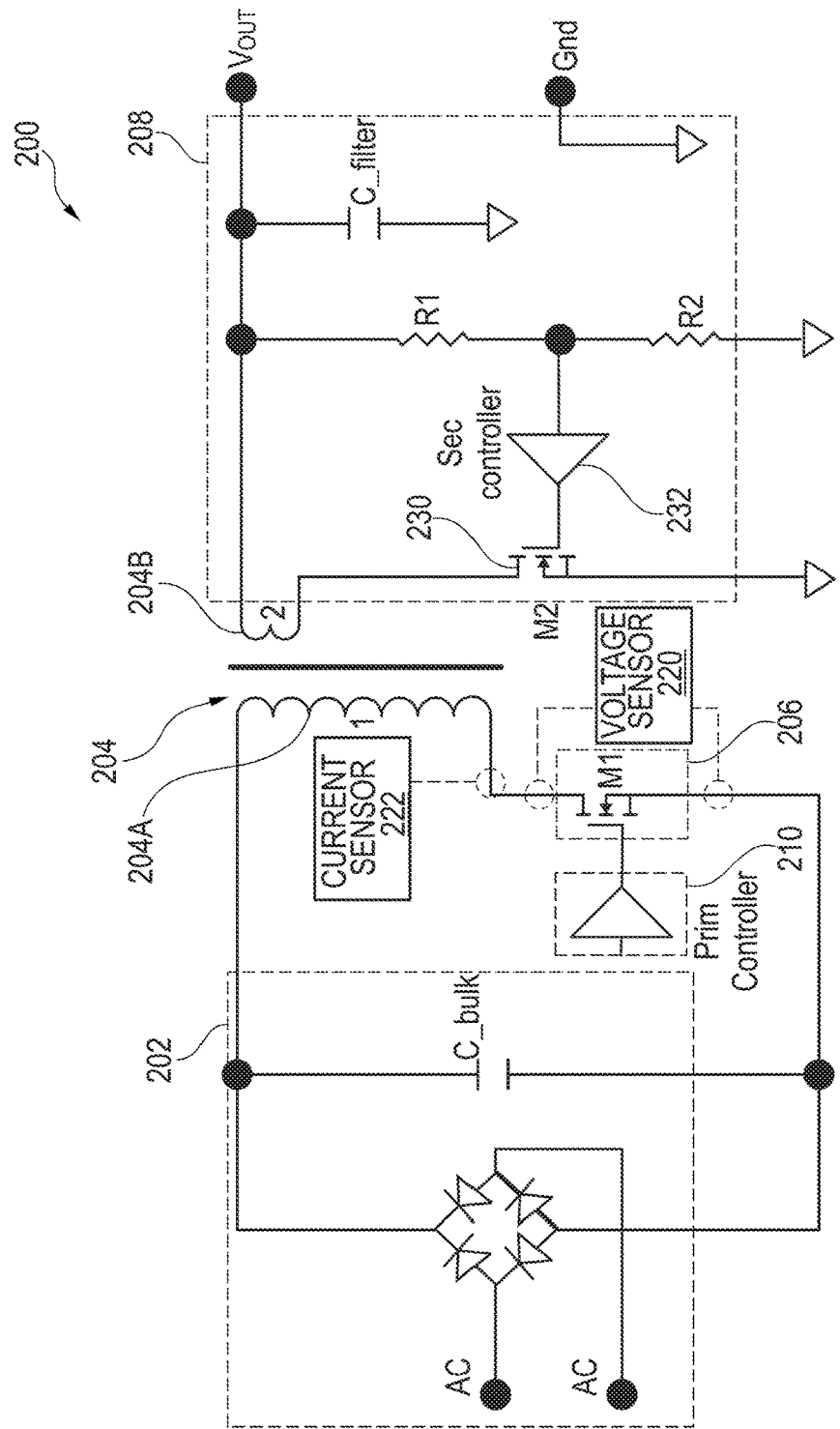
FIG. 2 is a circuit diagram illustrating a circuit configured for valley mode switching with fixed frequency in accordance with one or more techniques of this disclosure.

FIG. 2 is a circuit diagram illustrating a circuit 200 configured for valley mode switching with fixed frequency in accordance with one or more techniques of this disclosure. As shown, circuit 200 includes supply 202, primary side winding 204A and secondary side winding 204B (collectively, transformer 204), switching element 206, secondary circuit 208, and valley switching controller 210 (also referred to herein as, primary controller or simply "Prim Controller"), which may be examples of supply 102, primary side winding 104A and secondary side winding 104B, switching element 106, secondary circuit 108, and valley switching controller 110 of FIG. 1, respectively. Circuit 200 may further include voltage sensor 220 and current sensor 222. Circuit 200 may include additional components than those shown.

Voltage sensor 220 may be configured to generate an indication of a voltage measured at switching element 206. For example, voltage sensor 220 may be configured to generate an indication of a voltage measured at switching element 206 when valley switching controller 210 is outputting a disabling signal to switching element 206. As shown, voltage sensor 220 may be configured to measure a voltage between a drain of switching element 206 and a source of switching element 206 to generate the indication of the voltage measured at switching element 206 when valley switching controller 210 is outputting the disabling signal to a control node of switching element 206. Voltage sensor 220 may include a capacitive type voltage sensor, a resistive type voltage sensor, or another type of voltage sensor.

As shown, switching element 206 may be arranged as a low side switch. In the example of FIG. 2, a positive terminal of supply 202 is coupled to a first node of primary side winding 204A. In this example, a second node of primary side winding 204A is coupled to the drain of switching element 206. In this example, the source of switching element 206 is coupled to a negative terminal of supply 202.

Alternatively, switching element 206 may be arranged as a high side switch. For example, the positive terminal of supply 202 is coupled to the drain of switching element 206. In this example, the source of switching element 206 is coupled to a first node of primary side winding 204A. In this example, a second node of primary side winding 204A is coupled to a negative terminal of supply 202.

Valley switching controller 210 may be configured to receive, from voltage sensor 220, the indication of the voltage measured at switching element 206 when outputting the disabling signal to switching element 206. Valley switching controller 210 may be configured to determine a ringing frequency period based on the indication of the voltage measured at switching element 206 when outputting the disabling signal to switching element 206. For example, valley switching controller 210 may determine a time difference between adjacent valleys of an oscillating voltage at switching element 206 as the ringing frequency period. In some examples, valley switching controller 210 may be configured to determine a voltage valley is occurring at the oscillating voltage at switching element 206 based on the indication of the voltage measured at the switching element when driving the switching element.

Current sensor 222 may be configured to generate an indication of current measured at switching element 206 when valley switching controller 210 is driving switching element 206. For example, current sensor 222 may be configured to generate an indication of current measured at switching element 206 when valley switching controller 210 is outputting an enabling signal to switching element 206. Current sensor 222 may include a hall effect sensor, transformer sensor, resistor, or another type of current sensor.

Valley switching controller 210 may be configured to receive, from current sensor 222, the indication of the current measured at switching element 206 when driving switching element 206. In this example, valley switching controller 210 may be configured to determine current at switching element 206 is not less than a selected peak current value based on the indication of the current measured at the switching element.

Secondary circuit 208 may include switching element 230 and synchronous rectification (SR) controller 232 (also referred to herein as secondary controller or simply "Sec controller"). SR controller 232 may selectively switch switching element 230 to permit current to flow from secondary side winding 204B to an output of secondary circuit 208 and to prevent current from flowing from the output of secondary circuit 218 to secondary side winding 204B. SR controller 232 may include an analog circuit. In some examples, SR controller 232 may be a microcontroller on a single integrated circuit containing a processor core, memory, inputs, and outputs. For example, SR controller 232 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. In some examples, SR controller 232 may be a combination of one or more analog components and one or more digital components.

Figure 3:
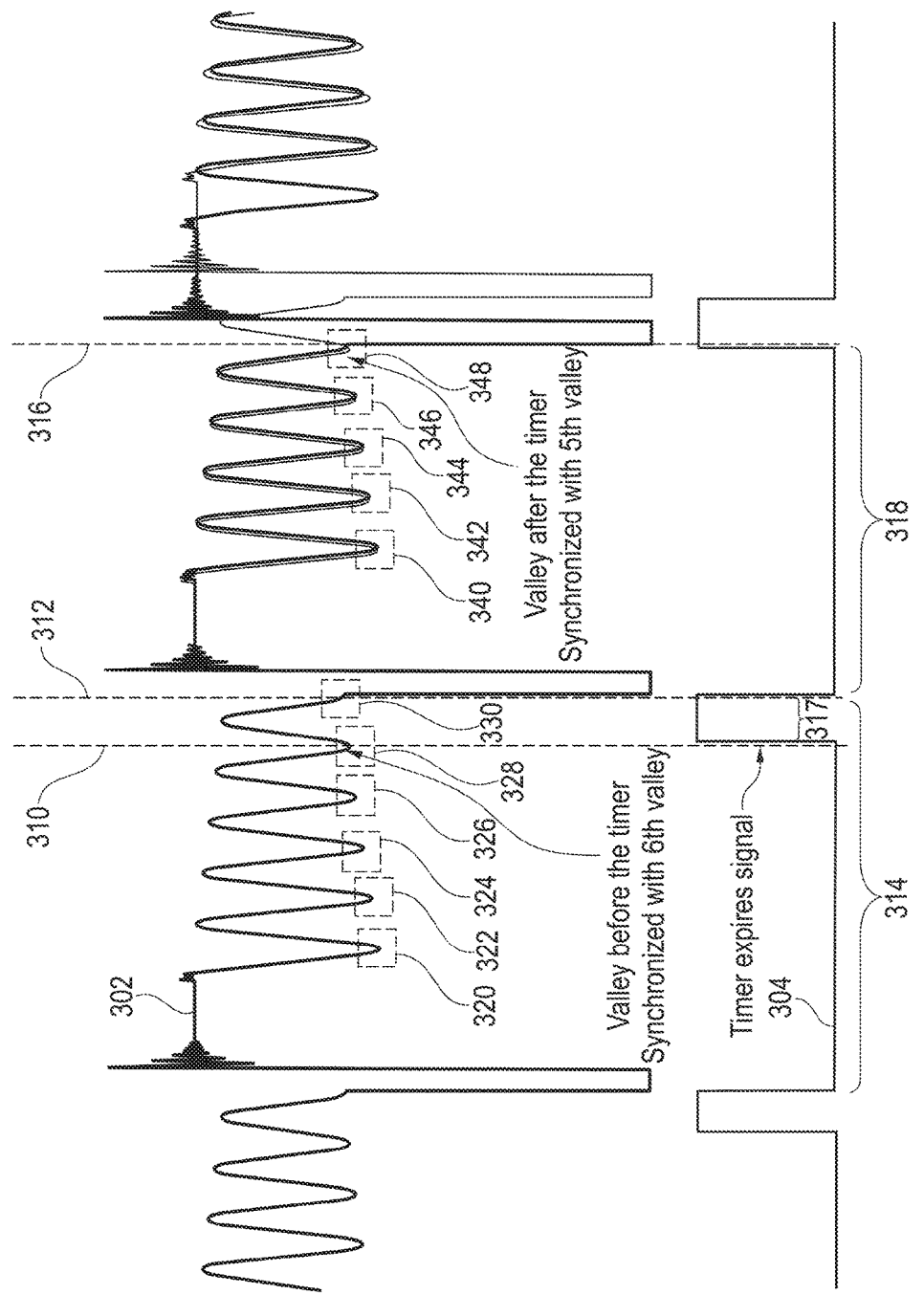
FIG. 3 is a graph illustration of valley mode switching in accordance with one or more techniques of this disclosure.

FIG. 3 is a graph illustration of valley mode switching in accordance with one or more techniques of this disclosure. The abscissa axis (e.g., horizontal) of FIG. 3 represents time and the ordinate axis (e.g., vertical) of FIG. 3 represents oscillating voltage 302 at switching element 106 and timer signal 304.

Generally, valley mode switching may operate in the following way. In a first step, a Pulse-Width Modulation (PWM) switching cycle starts. In the first step, a period timer is started. In a second step, the period timer expires and valley synchronization is engaged. In a third step, a next PWM switching cycle is synchronized with the first valley after the timer expires.

As shown, for first period 314, oscillating voltage 302 reaches voltage valleys 320, 322, 324, 326, and 328 before timer signal 304 has expired at time 310. In this example, valley switching controller 110 synchronizes with voltage valley 330 (e.g., a sixth voltage valley) at time 312, which extends first period 314 by time duration 317.

In contrast, for second period 318, oscillating voltage 302 reaches voltage valleys 340, 342, 344, and 346 before signal 304 has expired at time 316. However, in this example, valley switching controller 110 synchronizes with voltage valley 348 (e.g., a fifth voltage valley) at time 316, which does not significantly extend second period 318. As such, the switching period is not exactly defined by timer signal 304 but is instead defined by a combination of timer signal 304 and a synchronization window which may be as wide as the ringing frequency (e.g., time duration 317). For some systems, the switching period being defined by the combination of timer signal 304 and the synchronization window could account up to +/−20% of the frequency variation. Some applications, like capacitive touch screen sensors, rely on quite zones in the spectrum to avoid interference of the useful signal with power supply common mode noise. As such, variable power supply switching frequency doesn't allow proper operation of such systems.

Figure 4:
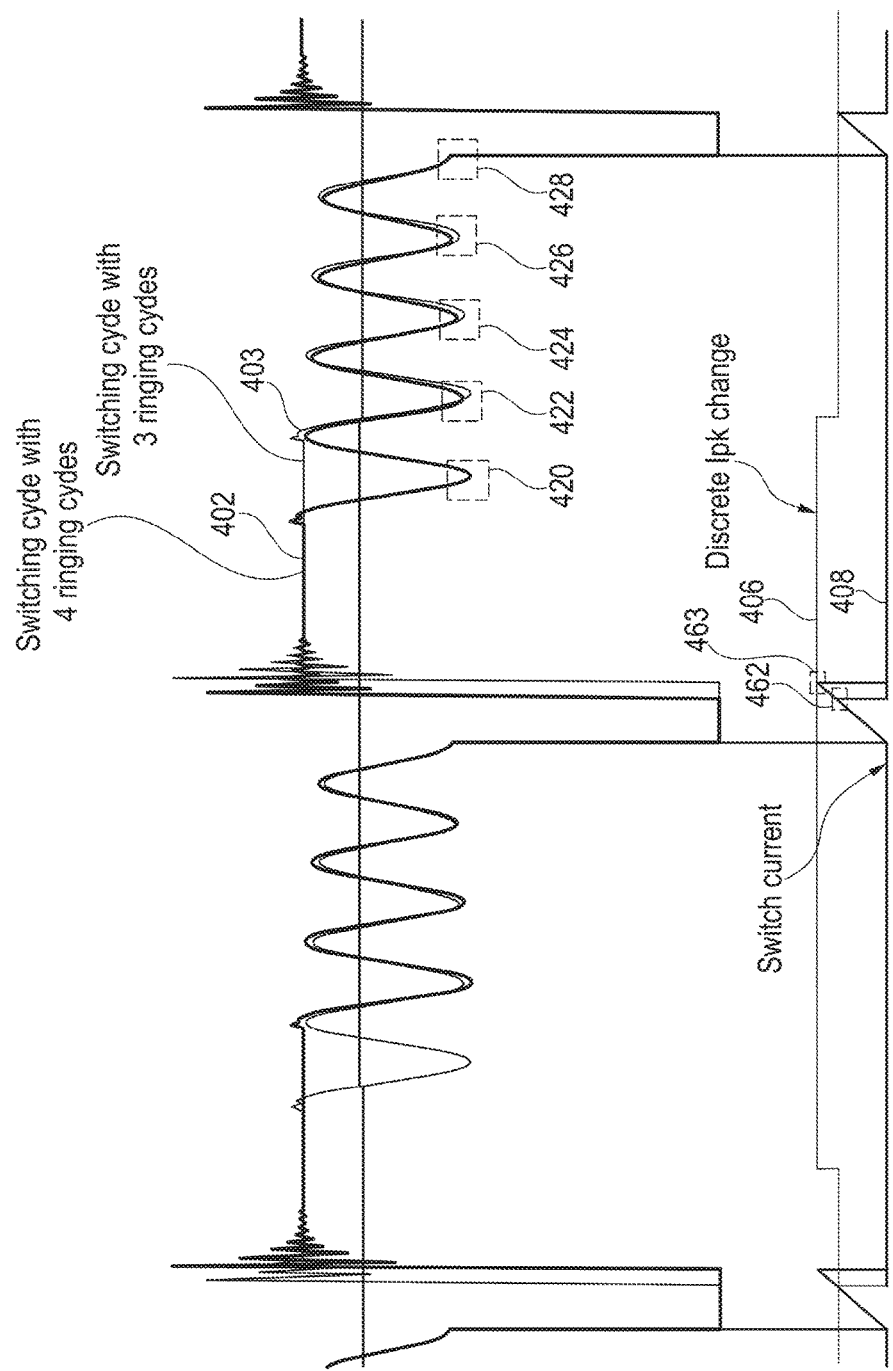
FIG. 4 is a graph illustration of valley mode switching with fixed frequency in accordance with one or more techniques of this disclosure.

FIG. 4 is a graph illustration of valley mode switching with fixed frequency in accordance with one or more techniques of this disclosure. The abscissa axis (e.g., horizontal) of FIG. 4 represents time and the ordinate axis (e.g., vertical) of FIG. 4 represents first oscillating voltage 402 at switching element 106, second oscillating voltage 403 at switching element 106, peak current value ("$I_{pk}$") 406, and current 408 at switching element 106.

As the PWM width is controlled by the peak current parameter continuously changing, $I_{pk}$, the frequency will continuously change a corresponding amount. Accordingly, valley switching controller 110 may be configured to act on $I_{pk}$ to control the frequency and period. For example, to avoid significant period change, valley switching controller 110 may be configured to select $I_{pk}$ from the discrete levels spaced in the way that distance between the levels is tuned to the switching time change of one ringing cycle.

Valley switching controller 110 may be configured to calculate each peak current value to drive an oscillating voltage at switching element 106 to correspond to a voltage valley at an end of a respective switching cycle. In some examples, valley switching controller 110 may be configured to calculate peak current values based on a ringing frequency period of the oscillating voltage. For example, to operate in the described fixed frequency valley mode switching, valley switching controller 110 may be configured to select the peak current value from the levels calculated using the following formula.

$$Ipk[k] = Ipk\_min + dIpk*k \quad \text{(EQUATION 1)}$$

Where Ipk[k] is an array of the allowed values, Ipk_min is a minimal $I_{pk}$ value (e.g., system parameter), dIpk is a delta of the Ipk corresponding one ringing cycle, and k is an integer number.

For example, valley switching controller 110 may be configured to multiply the delta of peak current (dIpk) by an integer number (k) for a respective peak current value of peak current values (Ipk[k]). Valley switching controller 110 may be configured to add a minimum peak current value (Ipk_min) to a result of multiplying the delta of peak current by the integer number for the respective peak current value (dIpk*k) to generate Ipk[k].

Correlation between the $I_{pk}$ value and the switching cycle change depends on the multiple factors and ringing time also could change from system to system. As such, valley switching controller 110 may be configured to calculate the step for $I_{pk}$ in real time (e.g., when valley switching controller 110 drives switching element 106). Valley switching controller 110 may determine a delta of peak current (dIpk) corresponding to one ringing cycle of the oscillation voltage based on the ringing frequency period (Tring). For example, valley switching controller 110 may be configured to calculate the step for $I_{pk}$ from switching history as follows.

$$dIpk = \frac{Ipk[n] - Ipk[n-1]}{Tcyle[n] - Tcycle[n-1]} Tring \quad \text{(EQUATION 2)}$$

Where dIpk is a delta of the $I_{pk}$ corresponding one ringing cycle, coefficient to calculate, Ipk[n] is a peak current value for the n-th switching cycle, Ipk[n−1] is a peak current value for the n−1 switching cycle, Tcycle[n] is an on plus reset time for the n-th switching cycle, Tcycle[n−1] is an on plus reset time value for the n−1 switching cycle, and Tring is a ringing frequency period, measured by valley switching controller 110. By selecting the $I_{pk}$ values from the calculated array in the described manner, valley switching controller 110 may achieve constant switching frequency and valley mode switching at the same time.

For example, valley switching controller 110 may be configured to subtract a peak current value for a previous switching cycle (Ipk[n−1]) from a peak current value for current switching cycle (Ipk[n]) to determine a difference of peak current (Ipk[n]−Ipk[n−1]). In this example, valley switching controller 110 may be configured to multiply the difference of peak current and ringing frequency period (Tring) to determine a ringing factor.

Valley switching controller 110 may be configured to subtract an on time value plus reset time value for the previous switching cycle (Tcyle[n−1]) from an on time value plus reset time value for the current switching cycle (Tcyle[n]) to determine a difference of switching cycles (Tcyle[n]−Tcycle [n−1]). In this example, valley switching controller 110 may be configured to divide the ringing factor (Ipk[n]−Ipk[n−1]) by the difference of switching cycles (Tcyle[n]−Tcycle[n−1]) to determine the delta of peak current (dIpk) corresponding to one ringing cycle of the oscillation voltage.

If the difference between switching cycles is small, the denominator could be very small and may cause significant errors. As such, to avoid a very small denominator, valley switching controller 110 may be configured to use the difference of switching cycles only for cycles with a substantial change (e.g., with the current difference one or more steps). For example, valley switching controller 110 may be configured to refrain from dividing the difference of peak current by the difference of switching cycles to determine a ringing factor shown in EQUATION 1. For instance, valley switching controller 110 may be configured to calculate the step for $I_{pk}$ from switching history as follows.

$$dIpk = (Ipk[n] - Ipk[n-1]) Tring \quad \text{(EQUATION 3)}$$

Accordingly, in some examples, valley switching controller 110 may be configured to use of $I_{pk}$, and the switching cycle parameter, Tcycle, to implement a control law to enable fixed frequency switching operation and at the same time to enable switching in between the valley, in a flyback controller. In some examples, valley switching controller 110 may be configured to perform the calculation of (e.g., measurement of) the dIpk coefficient, a ratio between current peak change ($I_{pk}$), and delta Tcycle change (Tcycle), to jump in between the voltage valleys.

In the example of FIG. 4, valley switching controller 110 selects $I_{pk}$ 462. In this example, first oscillating voltage 402 at switching element 106 reaches voltage valleys 420, 422, 424, and 426 (e.g., 4 ringing cycles). In this example, valley switching controller 110 calculates $I_{pk}$ 462 to control the frequency and period. For instance, valley switching controller 110 calculates $I_{pk}$ 462 according to one or more of EQUATIONS 1-3. As such, voltage valley 428 occurs at the end of the period for $I_{pk}$ 462.

As shown, valley switching controller 110 may alternatively select $I_{pk}$ 463. In this example, second oscillating voltage 403 at switching element 106 omits voltage valley 420 and reaches voltage valleys 422, 424, and 426 (e.g., 3 ringing cycles). In this example, valley switching controller 110 calculates $I_{pk}$ 463 to control the frequency and period. For instance, valley switching controller 110 calculates $I_{pk}$ 463 according to one or more of EQUATIONS 1-3. As such, voltage valley 428 occurs at the end of the period for $I_{pk}$ 463.

Figure 5:
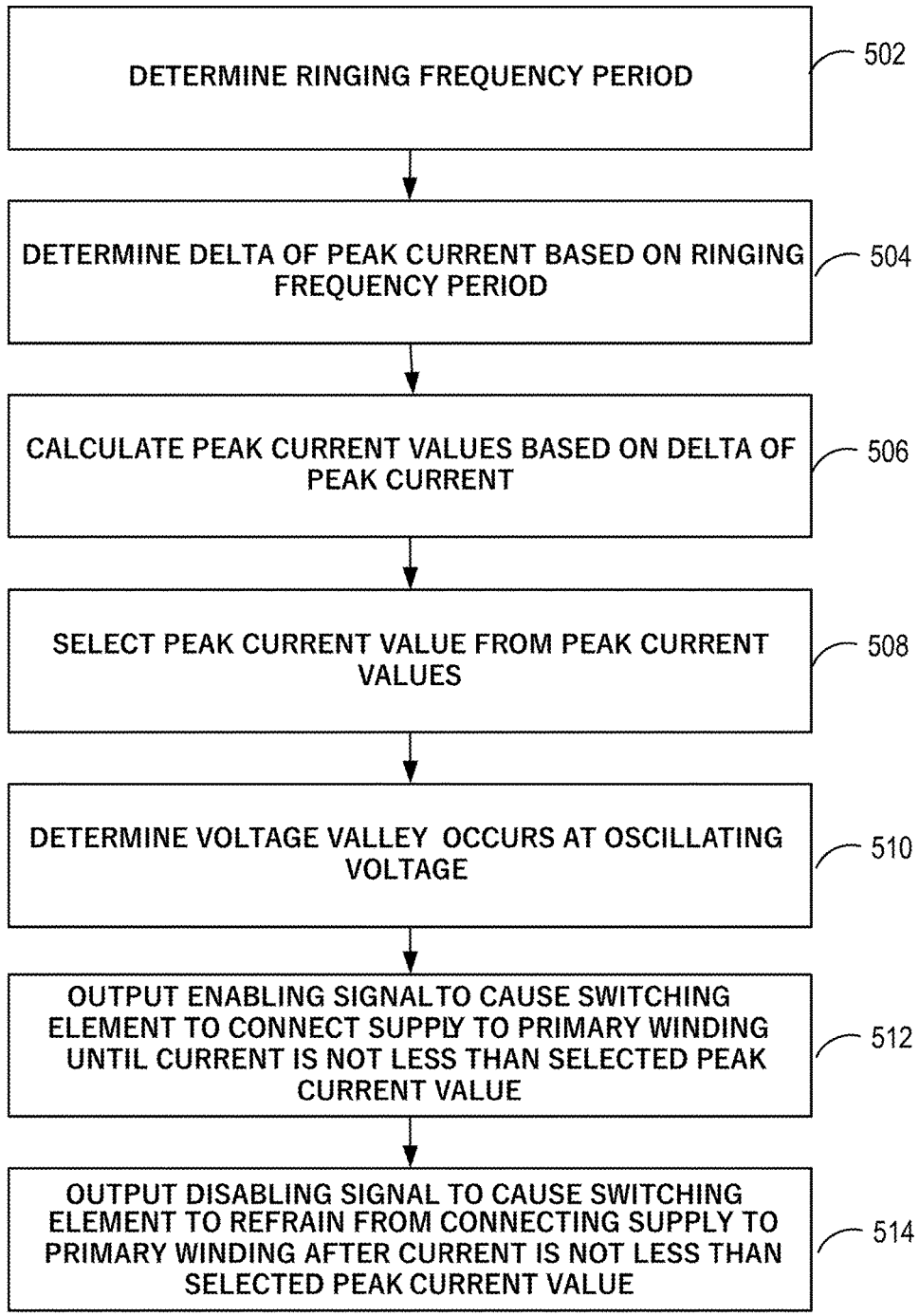
FIG. 5 is a flow diagram for a method for controlling a switching mode power supply in accordance with one or more techniques of this disclosure.

FIG. 5 is a flow diagram for a method for controlling a switching mode power supply in accordance with one or more techniques of this disclosure. FIG. 5 is described in the context of FIGS. 1-4 for exemplary purposes only. Valley switching controller 110 may perform the steps illustrated in FIG. 5 for each switching cycle. In operation, valley switching controller 110 determines a ringing frequency period (502). For example, valley switching controller 110 determines the ringing frequency period as a difference between adjacent voltage valleys of an oscillation voltage between a drain of switching element 104 and a source of switching element 104 while outputting a disabling signal to a control node of switch element 104.

Valley switching controller 110 determines a delta of peak current based on the ringing frequency period (504). For examples, valley switching controller 110 determines a delta of peak current using EQUATION 2 and/or EQUATION 3. Valley switching controller 110 calculates peak current values based on the delta of the peak current (506). For examples, valley switching controller 110 determines a delta of peak current using EQUATION 1. Valley switching controller 110 selects a peak current value from the peak current values (508). For example, valley switching controller 110 selects a peak current value from the peak current values to set an output voltage at secondary circuit 108 to correspond to a regulated voltage, current, or power.

Valley switching controller 110 determines a voltage valley occurs at the oscillating voltage (510). For example, valley switching controller 210 may receive, from voltage sensor 220, an indication of the voltage measured at switching element 206 when outputting the disabling signal to switching element 206. In this example, valley switching controller 110 may determine a voltage valley occurs at the oscillating voltage when the indication of the voltage measured at switching element 206 corresponds to a minimum voltage relative to adjacent values of the oscillating voltage.

Valley switching controller 110 outputs an enabling signal to cause switching element 106 to connect supply 102 to primary side winding 104A until current is not less than the selected peak current value (512). For example, valley switching controller 210 receives, from current sensor 222, an indication of the current measured at switching element 206 when driving switching element 206. In this example, valley switching controller 110 outputs the enabling signal while the indication of the current measured at switching element 206 corresponds to a current value that is less than the selected peak current value.

Valley switching controller 110 outputs a disabling signal to cause a switching element to refrain from connecting the supply to the primary winding after current is not less than the selected peak current value (514). For example, valley switching controller 210 outputs the disabling signal once the indication of the current measured at switching element 206 corresponds to a current value that is not less than the selected peak current value.

While a device has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The techniques of this disclosure may be implemented in a device or article of manufacture comprising a computer-readable storage medium. The term "processing circuitry," as used herein may refer to any of the foregoing structure or any other structure suitable for processing program code and/or data or otherwise implementing the techniques described herein. Elements of system 100 may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein. Processing circuitry may also include analog components arranged in a mixed-signal IC.

System 100 may include memory. One or more memory devices of the memory may include any volatile or non-volatile media, such as a RAM, ROM, non-volatile RAM (NVRAM), electrically erasable programmable ROM (EEPROM), flash memory, and the like. One or more memory devices of the memory may store computer readable instructions that, when executed by the processing circuitry, cause the processing circuitry to implement the techniques attributed herein to the processing circuitry.

Elements system 100 may be programmed with various forms of software. The processing circuitry may be implemented at least in part as, or include, one or more executable applications, application modules, libraries, classes, methods, objects, routines, subroutines, firmware, and/or embedded code, for example. The processing circuitry may be configured to receive voltage signals, determine switching frequencies, and deliver control signals.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

The following examples may illustrate one or more aspects of the disclosure.

Example 1

A controller for a switching mode power converter, the controller being configured to: drive a switching element to selectively connect a supply to a primary side winding of a transformer to generate a regulated voltage, current, or power at a secondary side winding of the transformer, wherein to drive the switching element to selectively connect the supply, the controller is configured to, for each switching cycle of a plurality of switching cycles: select a peak current value from a plurality of peak current values, each peak current value of the plurality of peak current values being calculated to drive an oscillating voltage at the switching element to correspond to a voltage valley at an end of a respective switching cycle of the plurality of switching cycles; in response to determining a voltage valley is occurring at the oscillating voltage at the switching element, output an enabling signal to cause the switching element to generate a channel electrically connecting the supply to the primary side winding until current at the switching element is not less than the selected peak current value; and output a disabling signal to cause the switching element to refrain from generating the channel electrically connecting the supply to the primary side winding after current at the switching element is not less than the selected peak current value.

Example 2

The controller of example 1, wherein the controller is configured to: calculate the plurality of peak current values based on a ringing frequency period of the oscillating voltage.

Example 3

The controller of any combination of examples 1-2, wherein the controller is configured to: receive, from a voltage sensor, an indication of a voltage measured at the switching element when outputting the disabling signal; and determine the ringing frequency period based on the indication of the voltage measured at the switching element when outputting the disabling signal.

Example 4

The controller of any combination of examples 1-3, wherein the switching element comprises a drain and a source, wherein the voltage measured at the switching element is between the drain of the switching element and the source of the switching element, wherein the supply comprises a positive terminal and a negative terminal, wherein the primary side winding comprises a first node and a second node, and wherein: the positive terminal is coupled to the first node of the primary side winding, the second node of the primary side winding is coupled to the drain, and the source is coupled to the negative terminal; or the positive terminal is coupled to the drain, the source is coupled to the first node of the primary side winding, and the second node of the primary side winding is coupled to the negative terminal.

Example 5

The controller of any combination of examples 1-4, wherein, to calculate the plurality of peak values, the controller is configured to: determine a delta of peak current corresponding to one ringing cycle of the oscillation voltage based on the ringing frequency period.

Example 6

The controller of any combination of examples 1-5, wherein, to determine the delta of peak current, the controller is configured to: subtract a peak current value for a previous switching cycle of the plurality of switching cycles from a peak current value for current switching cycle of the plurality of switching cycles to determine a difference of peak current; and multiply the difference of peak current and the ringing frequency period to determine a ringing factor.

Example 7

The controller of any combination of examples 1-6, wherein, to determine the delta of peak current, the controller is configured to: subtract an on time value plus reset time value for the previous switching cycle of the plurality of switching cycles from an on time value plus reset time value for the current switching cycle of the plurality of switching cycles to determine a difference of switching cycles; divide the ringing factor by the difference of switching cycles.

Example 8

The controller of any combination of examples 1-7, wherein, to calculate the plurality of peak current values, the controller is configured to, for each peak current value of the plurality of peak current values: multiply the delta of peak current by an integer number for the respective peak current value of the plurality of peak current values.

Example 9

The controller of any combination of examples 1-8, wherein, to calculate the plurality of peak current values, the controller is configured to, for each peak current value of the plurality of peak current values: add a minimum peak current value to a result of multiplying the delta of peak current by the integer number for the respective peak current value of the plurality of peak current values.

Example 10

The controller of any combination of examples 1-9, wherein the controller is configured to: receive, from a current sensor, an indication of a current measured at the switching element when driving the switching element; determine the current at the switching element is not less than the selected peak current value based on the indication of the current measured at the switching element; receive, from a voltage sensor, an indication of a voltage measured at the switching element when driving the switching element; and determine the voltage valley is occurring at the oscillating voltage at the switching element based on the indication of the voltage measured at the switching element when driving the switching element.

Example 11

A method for switching a power converter comprising: driving, by a controller, a switching element to selectively connect a supply to a primary side winding of a transformer to generate a regulated voltage, current, or power at a secondary side winding of the transformer, wherein driving the switching element to selectively connect the supply comprises, for each switching cycle of a plurality of switching cycle: selecting a peak current value from a plurality of peak current values, each peak current value of the plurality of peak current values being calculated to drive an oscillating voltage at the switching element to correspond to a voltage valley at an end of a respective switching cycle of the plurality of switching cycles; in response to determining a voltage valley is occurring at the oscillating voltage at the switching element, outputting an enabling signal to cause the switching element to generate a channel electrically connecting the supply to the primary side winding until a current at the switching element is not less than the selected peak current value; and outputting a disabling signal to cause the switching element to refrain from generating the channel electrically connecting the supply to the primary side winding after current at the switching element is not less than the selected peak current value.

Example 12

The method of example 11, further comprising: calculating, by the controller, the plurality of peak current values based on a ringing frequency period of the oscillating voltage.

Example 13

The method of any combination of examples 11-12, further comprising: receiving, by the controller, from a voltage sensor, an indication of a voltage measured at the switching element when outputting the disabling signal; and determining, by the controller, the ringing frequency period based on the indication of the voltage measured at the switching element when outputting the disabling signal.

Example 14

The method of any combination of examples 11-13, wherein the switching element comprises a drain and a source, wherein the voltage measured at the switching element is between the drain of the switching element and the source of the switching element, wherein the supply comprises a positive terminal and a negative terminal, wherein the primary side winding comprises a first node and a second node, and wherein: the positive terminal is coupled to the first node of the primary side winding, the second node of the primary side winding is coupled to the drain, and the source is coupled to the negative terminal; or the positive terminal is coupled to the drain, the source is coupled to the first node of the primary side winding, and the second node of the primary side winding is coupled to the negative terminal.

Example 15

The method of any combination of examples 11-14, wherein calculating the plurality of peak values comprises: determining a delta of peak current corresponding to one ringing cycle of the oscillation voltage based on the ringing frequency period.

Example 16

The method of any combination of examples 11-15, wherein determining the delta of peak current comprises: subtracting a peak current value for a previous switching cycle of the plurality of switching cycles from a peak current value for current switching cycle of the plurality of switching cycles to determine a difference of peak current; and multiplying the difference of peak current and the ringing frequency period to determine a ringing factor.

Example 17

The method of any combination of examples 11-16, wherein calculating the plurality of peak current values comprises, for each peak current value of the plurality of peak current values: multiplying the delta of peak current by an integer number for the respective peak current value of the plurality of peak current values.

Example 18

The method of any combination of examples 11-17, wherein calculating the plurality of peak current values comprises, for each peak current value of the plurality of peak current values: adding a minimum peak current value to a result of multiplying the delta of peak current by the integer number for the respective peak current value of the plurality of peak current values.

Example 19

The method of any combination of examples 11-18, comprising: receiving, by the controller, from a current sensor, an indication of a current measured at the switching element when driving the switching element; determining, by the controller, the current at the switching element is not less than the selected peak current value based on the indication of the current measured at the switching element; receiving, by the controller, from a voltage sensor, an indication of a voltage measured at the switching element when driving the switching element; and determining, by the controller, the voltage valley is occurring at the oscillating voltage at the switching element based on the indication of the voltage measured at the switching element when driving the switching element.

Example 20

A system for operating a switching mode power converter comprising: a supply; a transformer comprising a primary side winding and a secondary side winding; a switching element; a controller configured to drive the switching element to selectively connect the supply to the primary side winding to generate a regulated voltage, current, or power at the secondary side winding, wherein to drive the switching element to selectively connect the supply, the controller is configured to, for each switching cycle of a plurality of switching cycles: select a peak current value from a plurality of peak current values, each peak current value of the plurality of peak current values being calculated to drive an oscillating voltage at the switching element to correspond to a voltage valley at an end of a respective switching cycle of the plurality of switching cycles; in response to determining a voltage valley is occurring at the oscillating voltage at the switching element, output an enabling signal to cause the switching element to generate a channel electrically connecting the supply to the primary side winding until current at the switching element is not less than the selected peak current value; and output a disabling signal to cause the switching element to refrain from generating the channel electrically connecting the supply to the primary side winding after current at the switching element is not less than the selected peak current value.

Various aspects have been described in this disclosure. These and other aspects are within the scope of the following claims.

The invention claimed is:

1. A controller for a switching mode power converter, the controller being configured to:
   drive a switching element to selectively connect a supply to a primary side winding of a transformer to generate a regulated voltage, current, or power at a secondary side winding of the transformer, wherein to drive the switching element to selectively connect the supply, the controller is configured to, for each switching cycle of a plurality of switching cycles:
  select a peak current value from a plurality of peak current values, each peak current value of the plurality of peak current values being calculated to drive an oscillating voltage at the switching element to correspond to a voltage valley at an end of a respective switching cycle of the plurality of switching cycles;
  in response to determining a voltage valley is occurring at the oscillating voltage at the switching element, output an enabling signal to cause the switching element to generate a channel electrically connecting the supply to the primary side winding until current at the switching element is not less than the selected peak current value; and
  output a disabling signal to cause the switching element to refrain from generating the channel electrically connecting the supply to the primary side winding after current at the switching element is not less than the selected peak current value.

2. The controller of claim 1, wherein the controller is configured to:
  calculate the plurality of peak current values based on a ringing frequency period of the oscillating voltage.

3. The controller of claim 2, wherein the controller is configured to:
  receive, from a voltage sensor, an indication of a voltage measured at the switching element when outputting the disabling signal; and
  determine the ringing frequency period based on the indication of the voltage measured at the switching element when outputting the disabling signal.

4. The controller of claim 3, wherein the switching element comprises a drain and a source, wherein the voltage measured at the switching element is between the drain of the switching element and the source of the switching element, wherein the supply comprises a positive terminal and a negative terminal, wherein the primary side winding comprises a first node and a second node, and wherein:
  the positive terminal is coupled to the first node of the primary side winding, the second node of the primary side winding is coupled to the drain, and the source is coupled to the negative terminal; or
  the positive terminal is coupled to the drain, the source is coupled to the first node of the primary side winding, and the second node of the primary side winding is coupled to the negative terminal.

5. The controller of claim 2, wherein, to calculate the plurality of peak values, the controller is configured to:
  determine a delta of peak current corresponding to one ringing cycle of the oscillation voltage based on the ringing frequency period.

6. The controller of claim 5, wherein, to determine the delta of peak current, the controller is configured to:
  subtract a peak current value for a previous switching cycle of the plurality of switching cycles from a peak current value for current switching cycle of the plurality of switching cycles to determine a difference of peak current; and
  multiply the difference of peak current and the ringing frequency period to determine a ringing factor.

7. The controller of claim 6, wherein, to determine the delta of peak current, the controller is configured to:
  subtract an on time value plus reset time value for the previous switching cycle of the plurality of switching cycles from an on time value plus reset time value for the current switching cycle of the plurality of switching cycles to determine a difference of switching cycles;
  divide the ringing factor by the difference of switching cycles.

8. The controller of claim 5, wherein, to calculate the plurality of peak current values, the controller is configured to, for each peak current value of the plurality of peak current values:
  multiply the delta of peak current by an integer number for the respective peak current value of the plurality of peak current values.

9. The controller of claim 8, wherein, to calculate the plurality of peak current values, the controller is configured to, for each peak current value of the plurality of peak current values:
  add a minimum peak current value to a result of multiplying the delta of peak current by the integer number for the respective peak current value of the plurality of peak current values.

10. The controller of claim 1, wherein the controller is configured to:
  receive, from a current sensor, an indication of a current measured at the switching element when driving the switching element;
  determine the current at the switching element is not less than the selected peak current value based on the indication of the current measured at the switching element;
  receive, from a voltage sensor, an indication of a voltage measured at the switching element when driving the switching element; and
  determine the voltage valley is occurring at the oscillating voltage at the switching element based on the indication of the voltage measured at the switching element when driving the switching element.

11. A method for switching a power converter comprising:
  driving, by a controller, a switching element to selectively connect a supply to a primary side winding of a transformer to generate a regulated voltage, current, or power at a secondary side winding of the transformer, wherein driving the switching element to selectively connect the supply comprises, for each switching cycle of a plurality of switching cycle:
    selecting a peak current value from a plurality of peak current values, each peak current value of the plurality of peak current values being calculated to drive an oscillating voltage at the switching element to correspond to a voltage valley at an end of a respective switching cycle of the plurality of switching cycles;
    in response to determining a voltage valley is occurring at the oscillating voltage at the switching element, outputting an enabling signal to cause the switching element to generate a channel electrically connecting the supply to the primary side winding until a current at the switching element is not less than the selected peak current value; and
    outputting a disabling signal to cause the switching element to refrain from generating the channel electrically connecting the supply to the primary side winding after current at the switching element is not less than the selected peak current value.

12. The method of claim 11, further comprising:
 calculating, by the controller, the plurality of peak current values based on a ringing frequency period of the oscillating voltage.

13. The method of claim 12, further comprising:
 receiving, by the controller, from a voltage sensor, an indication of a voltage measured at the switching element when outputting the disabling signal; and
 determining, by the controller, the ringing frequency period based on the indication of the voltage measured at the switching element when outputting the disabling signal.

14. The method of claim 13, wherein the switching element comprises a drain and a source, wherein the voltage measured at the switching element is between the drain of the switching element and the source of the switching element, wherein the supply comprises a positive terminal and a negative terminal, wherein the primary side winding comprises a first node and a second node, and wherein:
 the positive terminal is coupled to the first node of the primary side winding, the second node of the primary side winding is coupled to the drain, and the source is coupled to the negative terminal; or
 the positive terminal is coupled to the drain, the source is coupled to the first node of the primary side winding, and the second node of the primary side winding is coupled to the negative terminal.

15. The method of claim 12, wherein calculating the plurality of peak values comprises:
 determining a delta of peak current corresponding to one ringing cycle of the oscillation voltage based on the ringing frequency period.

16. The method of claim 15, wherein determining the delta of peak current comprises:
 subtracting a peak current value for a previous switching cycle of the plurality of switching cycles from a peak current value for current switching cycle of the plurality of switching cycles to determine a difference of peak current; and
 multiplying the difference of peak current and the ringing frequency period to determine a ringing factor.

17. The method of claim 15, wherein calculating the plurality of peak current values comprises, for each peak current value of the plurality of peak current values:
 multiplying the delta of peak current by an integer number for the respective peak current value of the plurality of peak current values.

18. The method of claim 17, wherein calculating the plurality of peak current values comprises, for each peak current value of the plurality of peak current values:
 adding a minimum peak current value to a result of multiplying the delta of peak current by the integer number for the respective peak current value of the plurality of peak current values.

19. The method of claim 11, comprising:
 receiving, by the controller, from a current sensor, an indication of a current measured at the switching element when driving the switching element;
 determining, by the controller, the current at the switching element is not less than the selected peak current value based on the indication of the current measured at the switching element;
 receiving, by the controller, from a voltage sensor, an indication of a voltage measured at the switching element when driving the switching element; and
 determining, by the controller, the voltage valley is occurring at the oscillating voltage at the switching element based on the indication of the voltage measured at the switching element when driving the switching element.

20. A system for operating a switching mode power converter comprising:
 a supply;
 a transformer comprising a primary side winding and a secondary side winding;
 a switching element;
 a controller configured to drive the switching element to selectively connect the supply to the primary side winding to generate a regulated voltage, current, or power at the secondary side winding, wherein to drive the switching element to selectively connect the supply, the controller is configured to, for each switching cycle of a plurality of switching cycles:
  select a peak current value from a plurality of peak current values, each peak current value of the plurality of peak current values being calculated to drive an oscillating voltage at the switching element to correspond to a voltage valley at an end of a respective switching cycle of the plurality of switching cycles;
  in response to determining a voltage valley is occurring at the oscillating voltage at the switching element, output an enabling signal to cause the switching element to generate a channel electrically connecting the supply to the primary side winding until current at the switching element is not less than the selected peak current value; and
  output a disabling signal to cause the switching element to refrain from generating the channel electrically connecting the supply to the primary side winding after current at the switching element is not less than the selected peak current value.

\* \* \* \* \*